(No Model.) 3 Sheets—Sheet 1.

O. EVENSTAD & O. SENSTAD.
MACHINE FOR MAKING PACKING SHAVINGS.

No. 397,281. Patented Feb. 5, 1889.

Witnesses:
Henry Huber
Carl Kay

Inventors
Ole Evenstad and
O. Senstad
by Goepel & Raegener
Attorneys.

N. PETERS, Photo-Lithographer, Washington, D.C.

(No Model.) 3 Sheets—Sheet 3.

O. EVENSTAD & O. SENSTAD.
MACHINE FOR MAKING PACKING SHAVINGS.

No. 397,281. Patented Feb. 5, 1889.

Witnesses:
Henry Huber
Carl Karp

Inventors
Ole Evenstad and
O. Senstad
by Briesen & Raegener
Attorneys.

UNITED STATES PATENT OFFICE.

OLE EVENSTAD AND OLAUS SENSTAD, OF RASTEN, STORELVEDALEN, NORWAY.

MACHINE FOR MAKING PACKING-SHAVINGS.

SPECIFICATION forming part of Letters Patent No. 397,281, dated February 5, 1889.

Application filed October 2, 1888. Serial No. 287,009. (No model.) Patented in Germany March 21, 1888, No. 45,685; in Belgium April 16, 1888, No. 81,134; in France May 23, 1888, No. 189,523, and in Denmark June 13, 1888, No. 430.

*To all whom it may concern:*

Be it known that we, OLE EVENSTAD and OLAUS SENSTAD, subjects of the King of Norway, and residents of Rasten, in Storelvedalen, Norway, have invented certain new and useful Improvements in Machines for Making Packing-Shavings, (for which Letters Patent were granted to us in Germany, No. 45,685, dated March 21, 1888; Belgium, No. 81,134, dated April 16, 1888; France, No. 189,523, dated May 23, 1888, and Denmark, No. 430, dated June 13, 1888,) of which the following is a specification.

The invention relates to an improved machine for making narrow shavings for packing purposes from shavings obtained as a waste product in planing-machines; and the invention consists of a machine for working up the shavings from planing-machines by cutting them into narrow strips, which are to be used for packing purposes, the cutting operation being performed by means of rotating rolls formed of a number of disks having beveled edges, the edges of the disks of one roller being placed against the edges of the disks of the other roller, so as to take up and cut longitudinally the shavings, which are conducted to the rolls by suitable conducting and conveying devices for cutting them into narrow strips, and, secondly, by an intermittently-actuated cutting device below the rolls, by which the length of the strip is regulated, adhering parts are separated from the packing-shavings by conducting them into a laterally-inclined reciprocating-screen, which discharges the shavings sidewise of the machine.

Figure 1:
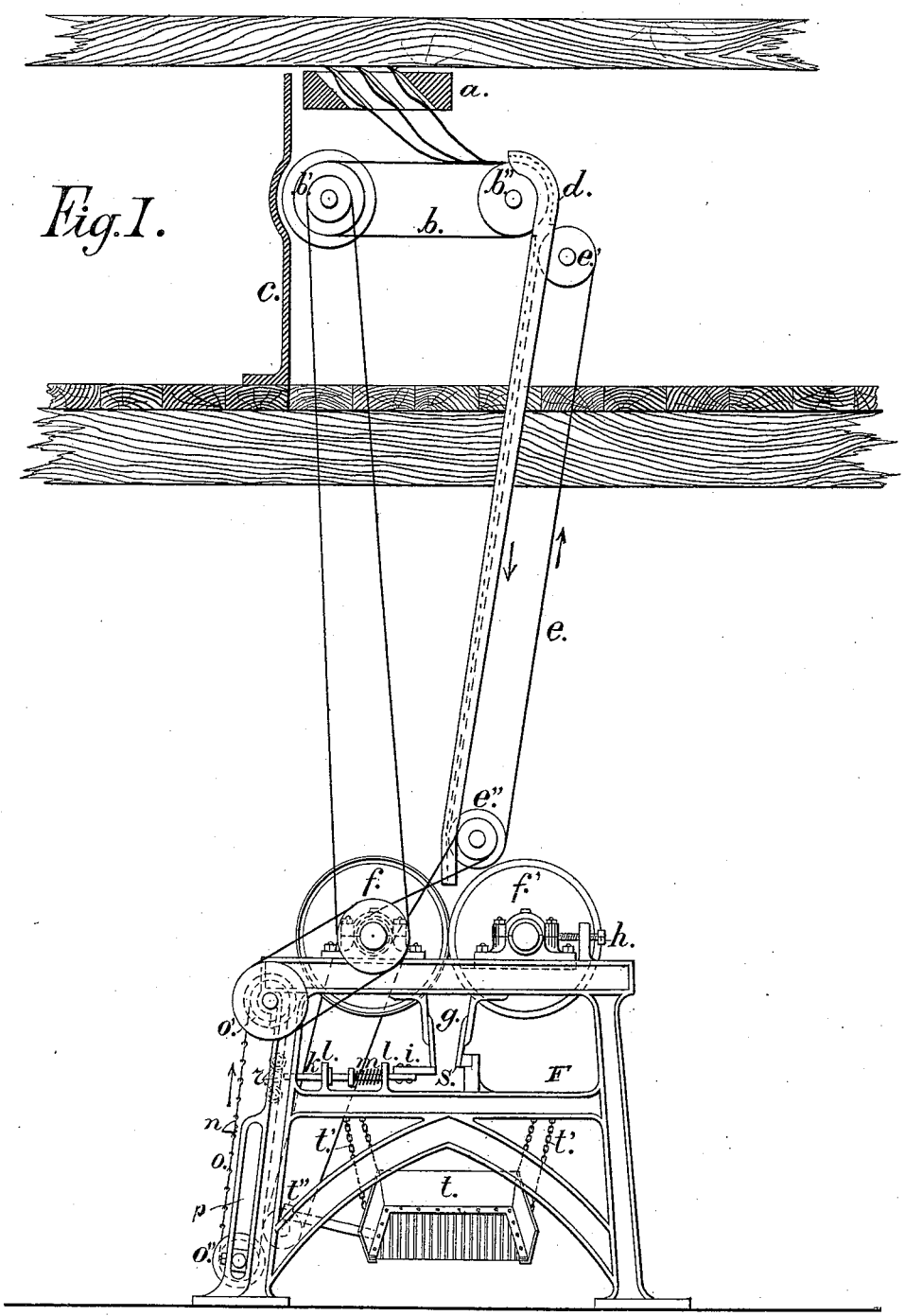
Figure 2:
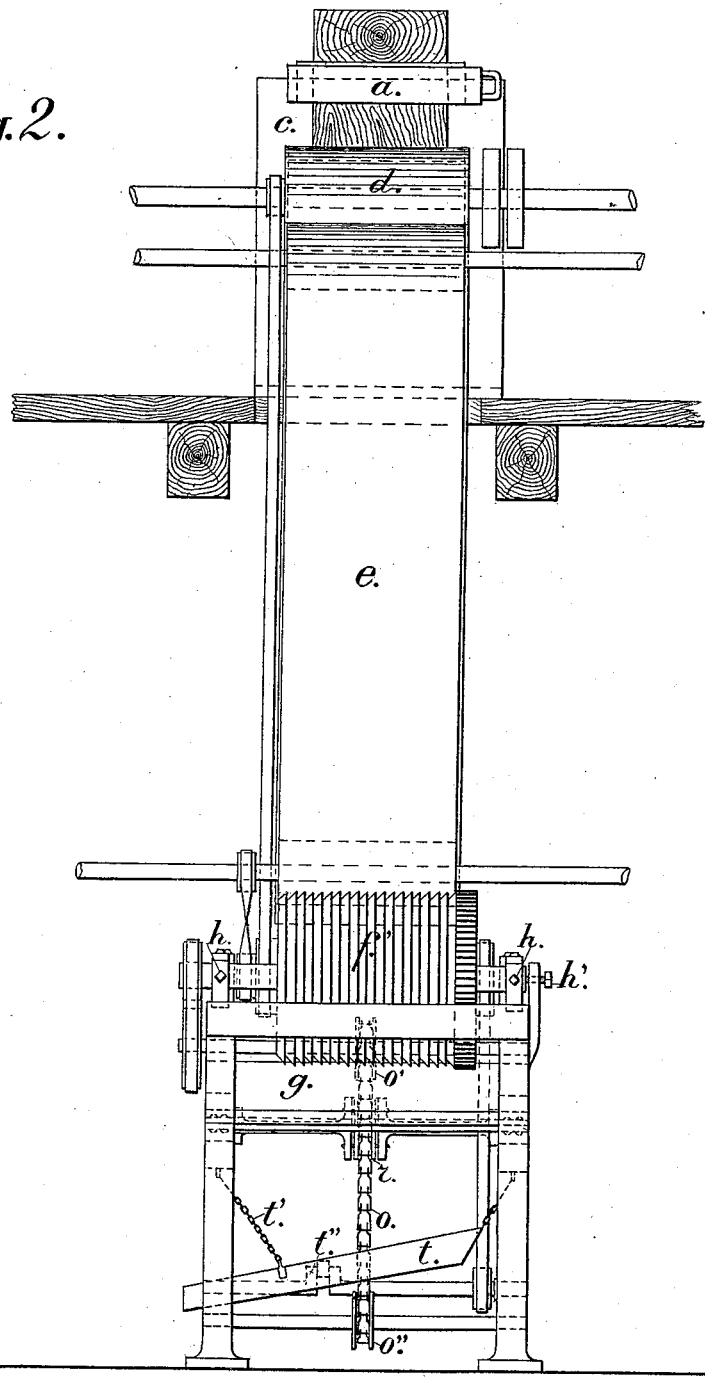
Figure 3:
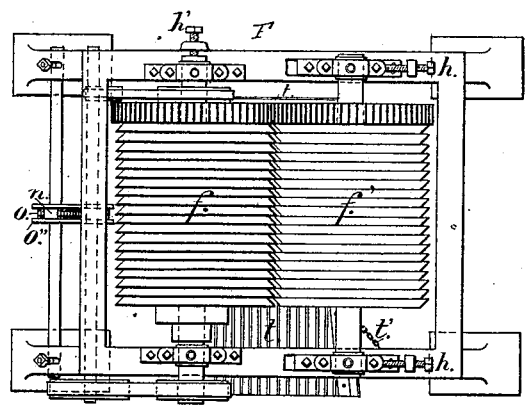
Figure 4:
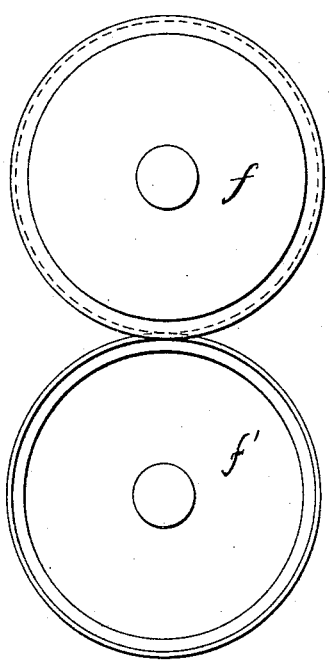
Figure 5:
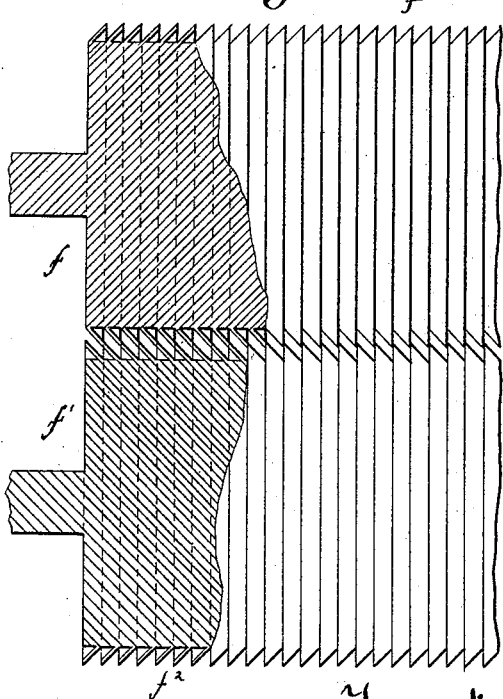

In the accompanying drawings, Figure 1 represents a side elevation of our improved machine for making narrow shavings used for packing purposes, the upper part being partly in section. Fig. 2 is an end elevation of the machine; Fig. 3, a top view of the same, the conveying parts being removed; and Figs. 4 and 5 show a detail end view and a top view, partly in section, of the cutting-rolls, drawn on a larger scale.

Similar letters of reference indicate corresponding parts.

Our improved machine for cutting up shavings into narrow strips that are used for packing purposes consists, essentially, of two rotary slitting-rolls, $f\,f'$, which are supported on a suitable supporting-frame, F, said rolls receiving motion from a suitable belt-and-pulley transmission from an overhead driving-shaft. The shavings are conveyed from the planes $a$ of the planing-machine upon an endless belt, $b$, which is stretched over a driving-pulley, $b'$, and a guide-pulley, $b''$, and from which the shavings are conducted, by means of a downwardly-extending conveyer, $d$, and the endless belt $e$, to the slitting-rolls $f\,f'$. The endless belt $e$ and conveyer $d$ may be turned on the axis of the pulley $b''$, so as to be moved out of the way and give convenient access to the planing-knives for regulating the same.

A transverse wall, $c$, extends across the planer and conveying-belt $b$, so as to prevent any chips from the planing-machine being conveyed to the conveying-belt. The conveyer $d$ forms a conducting-channel, one side of which is formed of said endless belt $e$, which is stretched over the rollers $e'\,e''$, which latter roller receives motion by a cross-belt and pulleys from the shaft of one of the slitting-rolls. The conveying-belt $b$ takes up the shavings immediately as they are delivered from the plane and takes them before they have a chance of curling or twisting into the channel $d$, retaining them in their position until they are delivered to the slitting-rolls $f\,f'$. The rolls $f\,f'$ are formed of a number of disks, $f^2$, having beveled edges, as shown clearly in Figs. 3 and 4, the faces of the disks of one roll being placed in contact with the faces of the disks of the other roll, so that when rotating the rolls they produce a cutting action on the shavings and cut them longitudinally into a number of narrow strips of different width, according to the thickness of the strips employed. In this manner narrow strips or shavings are obtained, which are used as a packing material. The relative position of the slitting-rolls $f\,f'$ is adjusted by means of screws $h$, which are applied to the bearings of the rolls $f'$, so as to move the same forward or backward in the guide-slots of the supporting-frame F, and of a screw, $h'$, which is applied to the bearing of the rolls $f$, so as to adjust the faces of its disks tightly against the faces of the disks of the roll $f'$. From the slitting-rolls $f\ f'$ the narrow strips or shavings pass to the downwardly-extending hopper $g$, below which is arranged an intermittently-actuated cutting device, by which the shavings are cut up into strips of uniform length. The cutting device consists of a horizontal cutter-blade, $i$, which is attached to a rod, $k$, and guided in lugs $l$ of the supporting-frame F. Between the lugs $l$ and collars on the rods $k$ are interposed spiral springs $m$, which move the knife $i$ in backward direction after the same has been moved forward by a small beveled lug, $n$, fixed on an endless chain, $o$, which is stretched over sprocket-wheels $o'\ o''$. The lower wheel, $o''$, is adjustable in slots $p$ of the supporting-frame F, so as to lengthen or shorten the endless chain $o$ and produce thereby the intermittent action of the lug $n$ on the cutter $i$ at longer or shorter intervals, according as longer or shorter strips are desired. As the plug $n$ passes over the guide-pulleys $r$, which are located above and below the guide-frame of the cutter $i$, the rods $k$ and the cutter are pushed forward, the knife $i$ engaging a fixed cutter, S, at the lower edge of the hopper $g$, and cutting off thereby the narrow strips or shavings. The spring $m$ returns the knife to its normal position as soon as the same is released from the lug $n$. At the lower part of the supporting-frame F is suspended a coarse screen, $t$, by chains $t'$, which screen is reciprocated by a connecting-rod, $t''$, operated by a shaft which is driven by a belt from one of the slitting-rolls. Any small chips or any refuse matter adhering to the narrow strips or shavings pass through the coarse meshes of the screen $t$ and drop below the same, while the strips or shavings are conveyed by the inclined screen from the machine. The shavings are then removed and compressed into suitable bales for shipment. In place of constructing the rolls $f\ f'$ from a series of disks having beveled edges, the same may also be made of one piece, with the cutting-rings turned off on the same. The cutting-edges of the rolls may also be made in any form or shape, provided the faces of the cutting-rings are brought closer together and face to face, so as to produce the proper cutting action on the shavings.

By the machine described the shavings can be worked up into a marketable article—namely, shavings for packing purposes, which can be shipped with greater convenience, the machine forming a useful and convenient auxiliary for planing-machines for the proper utilization of shavings made by the same.

Having thus described our invention, we claim as new and desire to secure by Letters Patent—

1. The combination, with rotary slitting-rolls provided with annular beveled ribs, the faces of the ribs of one roll being placed in contact with the faces of the ribs of the other roll, of screws for adjusting one of the rolls in longitudinal and the other roll in lateral direction, substantially as set forth.

2. In a machine for making narrow shavings for packing purposes, the combination of rotary rolls provided with annular beveled ribs, the faces of which are arranged in contact with each other, a hopper below said rolls, and an intermittently-actuated cutting device below the hopper for cutting off the narrow shavings in the proper length, substantially as set forth.

3. In a machine for making narrow shavings for packing purposes, the combination, with rotary slitting-rolls having annular ribs beveled at the circumference, the faces of the ribs of one roll being in contact with the faces of the ribs of the other roll, of a hopper below said rolls, an intermittently-actuated cutting device below said hopper, and an inclined oscillating screen suspended below the cutting device, substantially as set forth.

4. The combination, with a pair of slitting-rollers and a planing-machine, of a horizontal conveying-belt located below the cutter of the planing-machine, and a conveyer extending from said belt to the slitting-rollers, substantially as herein shown and described.

In testimony that we claim the foregoing as our invention we have signed our names in presence of two subscribing witnesses.

OLE EVENSTAD.
OLAUS SENSTAD.

Witnesses:
OLAV SENDSTAD,
F. ECKERSBERG.